(12) United States Patent
Shioe

(10) Patent No.: US 10,300,911 B2
(45) Date of Patent: May 28, 2019

(54) VEHICLE CONTROL APPARATUS AND VEHICLE CONTROL METHOD

(71) Applicant: FUJITSU TEN LIMITED, Kobe-shi, Hyogo (JP)

(72) Inventor: Masaya Shioe, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 144 days.

(21) Appl. No.: 15/373,374

(22) Filed: Dec. 8, 2016

(65) Prior Publication Data

US 2017/0217429 A1   Aug. 3, 2017

(30) Foreign Application Priority Data

Jan. 28, 2016   (JP) .................................. 2016-014722

(51) Int. Cl.

| | |
|---|---|
| B60R 11/04 | (2006.01) |
| B60W 10/18 | (2012.01) |
| B60W 10/20 | (2006.01) |
| B60W 30/08 | (2012.01) |
| B60W 50/14 | (2012.01) |

(Continued)

(52) U.S. Cl.
CPC ............. *B60W 30/08* (2013.01); *B60R 11/04* (2013.01); *B60W 10/182* (2013.01); *B60W 10/20* (2013.01); *B60W 50/14* (2013.01); *B60R 2011/0003* (2013.01); *B60R 2011/004* (2013.01); *B60W 2030/082* (2013.01); *B60W 2050/143* (2013.01); *B60W 2050/146* (2013.01); *B60W 2420/42* (2013.01); *B60W 2540/00* (2013.01); *B60W 2550/10* (2013.01); *B60W 2550/20* (2013.01); *B60W 2710/18* (2013.01); *B60W 2710/20* (2013.01); *B60W 2720/106* (2013.01); *B60W 2750/40* (2013.01); *G01S 19/42* (2013.01)

(58) Field of Classification Search
CPC .... B60W 30/08; B60W 10/182; B60W 10/20; B60W 50/14; B60W 2030/082; B60R 11/04
See application file for complete search history.

(56) References Cited

U.S. PATENT DOCUMENTS 5,195,606 A * 3/1993 Martyniuk ................ B60T 7/02
                                                                  180/272
8,930,060 B1 * 1/2015 Lu ......................... G05D 1/0214
                                                                  340/438

(Continued)

FOREIGN PATENT DOCUMENTS

| JP | H08-221679 A | 8/1996 |
|---|---|---|
| JP | 2005100107 A | 4/2005 |

(Continued)

*Primary Examiner* — Alan D Hutchinson
(74) *Attorney, Agent, or Firm* — Oliff PLC

(57) ABSTRACT

A vehicle control apparatus that is mounted in a vehicle issues a warning to a driver of the vehicle to stop the vehicle in a case where the collision has occurred between the vehicle and an object. The vehicle control apparatus stops the vehicle regardless of an operation by the driver after issuing the warning to the driver, in a case where the vehicle is not detected to be stopped. Thus, while giving a priority on prompting the driver to voluntarily stop the vehicle, it is possible to prevent the driver from fleeing a scene of the accident or the like.

4 Claims, 11 Drawing Sheets

(51) Int. Cl.
   *B60R 11/00*    (2006.01)
   *G01S 19/42*    (2010.01)

(56) References Cited

U.S. PATENT DOCUMENTS

| | | | |
|---|---|---|---|
| 2003/0163233 A1* | 8/2003 | Song .................... | G06Q 10/06 |
| | | | 701/31.4 |
| 2007/0052530 A1* | 3/2007 | Diebold ................ | B60R 21/013 |
| | | | 340/467 |
| 2010/0100276 A1* | 4/2010 | Fujinawa ............. | G07C 5/0891 |
| | | | 701/32.2 |
| 2010/0220892 A1* | 9/2010 | Kawakubo ............... | A61B 3/14 |
| | | | 382/103 |
| 2013/0261869 A1* | 10/2013 | Brenneis ........... | B60W 50/0205 |
| | | | 701/23 |
| 2014/0117651 A1* | 5/2014 | Enzaki ................... | B60K 28/14 |
| | | | 280/734 |
| 2014/0156157 A1* | 6/2014 | Johnson .................... | B60T 7/22 |
| | | | 701/70 |
| 2016/0332622 A1* | 11/2016 | Shiraishi .................... | B60T 7/22 |
| 2017/0046216 A1* | 2/2017 | Stenneth ............. | G06F 11/0793 |
| 2017/0174210 A1* | 6/2017 | Choi ..................... | B60W 10/18 |

FOREIGN PATENT DOCUMENTS

| | | | |
|---|---|---|---|
| JP | 2007241898 | A | 9/2007 |
| JP | 2007246076 | A | 9/2007 |
| JP | 2007-293536 | A | 11/2007 |
| JP | 2009286250 | A | 12/2009 |
| JP | 2014114008 | A | 6/2014 |
| JP | 2014123199 | A | 7/2014 |
| JP | 2015-003589 | A | 1/2015 |
| JP | 2015118438 | A | 6/2015 |

\* cited by examiner

| | | |
|---|---|---|
| NP | REGISTRATION NUMBER | KOBE 500 FU 22-XX |
| GD | ACCELERATION | 0.05G |
| PD | TIME & DATE | AT 22:15:XX ON DECEMBER XXTH, 20XX |
| PO | LOCATION | 34° 39' XX" NORTH LATITUDE<br>135° 09' XX" EAST LONGITUDE |
| AD | SITE | NEAR XXXX INTERSECTION ON ROUTE XX FOR WEST |
| GP | CABIN IMAGE | |

VEHICLE CONTROL APPARATUS AND VEHICLE CONTROL METHOD

BACKGROUND OF THE INVENTION

Field of the Invention

The invention relates to a technology that controls a vehicle.

Description of the Background Art

In recent years, some vehicles that autonomously travel with no operation by drivers, i.e., autonomous vehicles, have been known. Those autonomous vehicles are a promising technology to eliminate or decrease burden of drivers.

However, when an autonomous vehicle has caused a collision accident and the like, if the driver does not stop the vehicle because the driver is not aware of the accident, the vehicle may continue travelling to a destination so that the accident may not be sorted out. Moreover, the driver may not stop the vehicle intentionally to attempt to flee a scene of the accident. In this case, the accident cannot be sorted out. Thus, this is a challenge of the autonomous vehicles.

SUMMARY OF THE INVENTION

According to one aspect of the invention, a vehicle control apparatus that controls a vehicle includes a microcomputer configured to: detect whether a collision has occurred between the vehicle and an object; issue a warning to a driver of the vehicle to stop the vehicle in a case where the collision has occurred; detect whether the vehicle is stopped; and stop the vehicle regardless of an operation by the driver after issuing the warning to the driver, in a case where the vehicle is not detected to be stopped after issuing the warning to the driver.

Thus, while giving a priority on voluntary stopping of the vehicle by the driver, it is possible that the vehicle is surely stopped even in a case where the driver does not stop the vehicle.

According another aspect of the invention, the microcomputer is further configured to: acquire image data acquired by capturing an image of a cabin of the vehicle; and send the image data to a predetermined communication apparatus before stopping the vehicle in the case where the collision has occurred.

Thus, since the image data is sent before the microcomputer stops the vehicle, it is possible to prevent the image data from being falsified.

Therefore, an object of the invention is to provide a technology that appropriately controls the vehicle that has caused an accident or the like.

These and other objects, features, aspects and advantages of the invention will become more apparent from the following detailed description of the invention when taken in conjunction with the accompanying drawings.

BRIEF DESCRIPTION OF THE DRAWINGS

FIG. 4 illustrates an example of reporting data.

DESCRIPTION OF THE EMBODIMENTS

Embodiments of the invention will be described below with reference to the drawings.

1. First Embodiment

<1-1. Outline>

Figure 1:
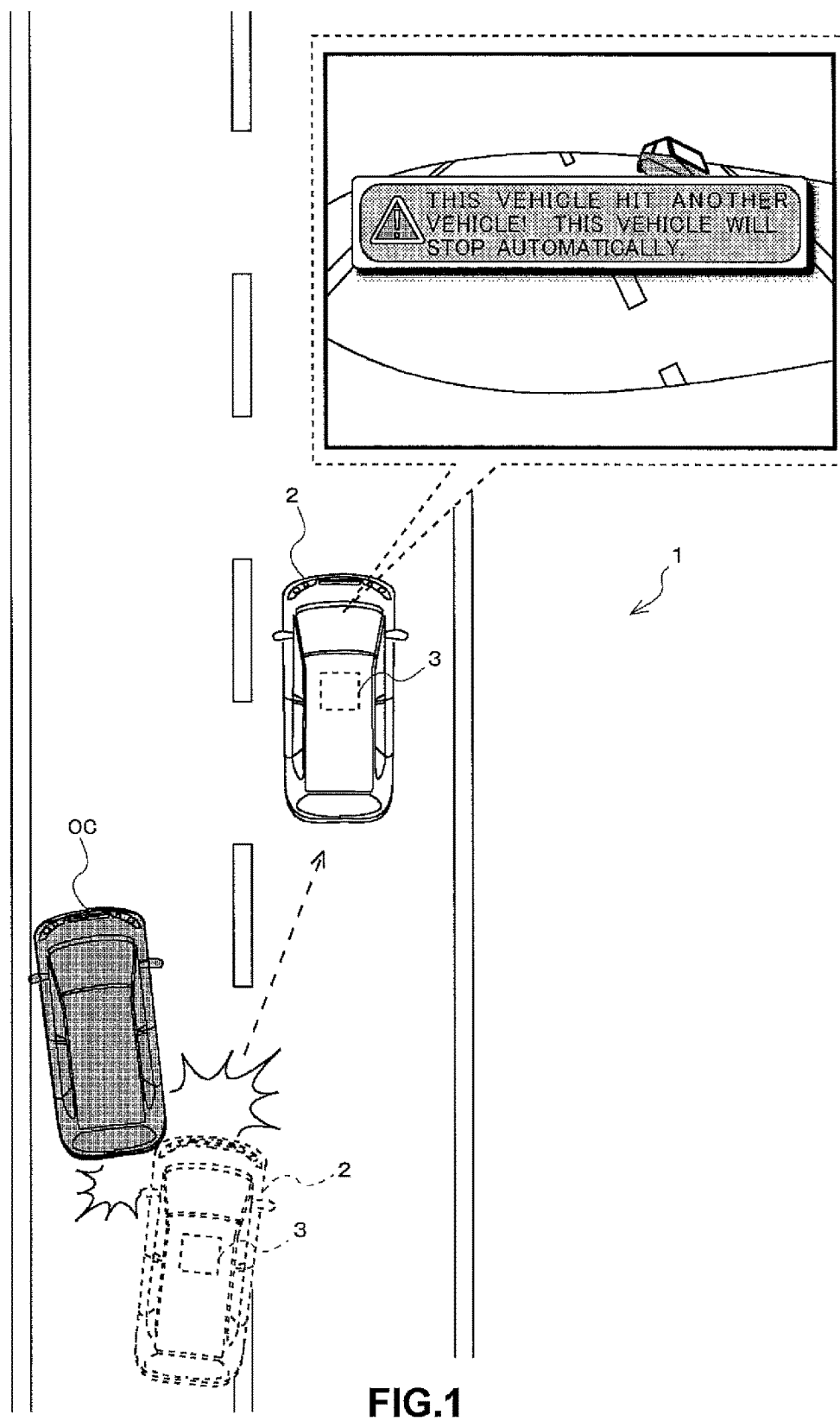
FIG. 1 illustrates an outline of a vehicle control system.

FIG. 1 illustrates an outline of a vehicle control system 1 of this embodiment. While a vehicle control apparatus 3 mounted in a vehicle 2 prompts a driver of the vehicle 2 who has caused a collision accident or the like with another vehicle OC, to stop the vehicle 2, the vehicle control system 1 automatically stops the vehicle 2.

Figure 2:
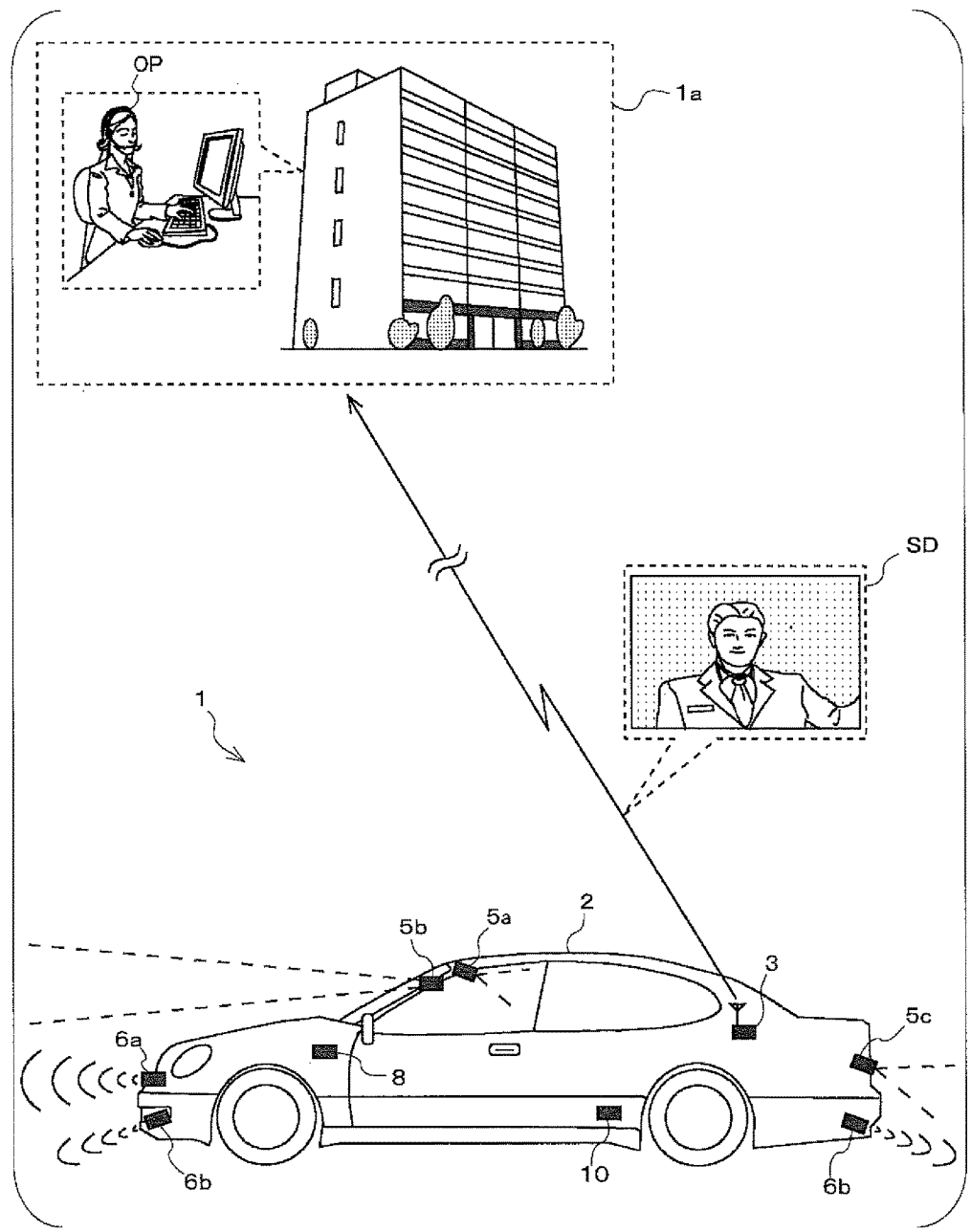
FIG. 2 illustrates another outline of the vehicle control system.

FIG. 2 illustrates another outline of the vehicle control system 1 of this embodiment. In a case where an acceleration sensor (not illustrated) built in an airbag ECU 8 detects an occurrence of a collision, the vehicle control apparatus 3 mounted in the vehicle 2 sends reporting data SD to a control center 1a. The reporting data SD includes a face picture of the driver captured by a cabin camera 5a in a cabin of the vehicle 2, a vehicle register number, a time at which an accident has occurred, an accident site, etc.

Once recognizing that the accident or the like has occurred by receiving the reporting data SD, the control center 1a rapidly sends rescue personnel and the like to a scene of the accident. Moreover, a monitoring person OP stationed in the control center 1a attempts to contact the driver, and reports to a fire department and/or a police station according to presence of an injured person and a size of the accident.

Moreover, the vehicle 2 includes a running control ECU 10 that executes autonomous drive that instructs the vehicle 2 such that the vehicle 2 travels autonomously. The running control ECU 10 causes the vehicle 2 to autonomously travel to a destination based on information from a front camera 5b, surrounding area monitoring cameras 5c, a front radar 6a, a surrounding area monitoring radar 6b and a navigation apparatus 11 included in the vehicle 2. Once being notified of an occurrence of a collision accident, the running control ECU 10 changes the destination to a near safe place and stops the vehicle 2 immediately.

Thus, while giving a priority on prompting the driver to voluntarily stop the vehicle 2, it is possible to prevent the driver from fleeing a scene of the accident or the like. Moreover, since the vehicle 2 stops the safe place immediately, the driver easily sorts out the accident or the like. The control that causes the vehicle to autonomously travel and stop with no operation by the driver will be referred to below as "autonomous drive," "automatic stop," etc. The vehicle control system 1 will be described below in detail.

<1-2. Configuration>

Figure 3:
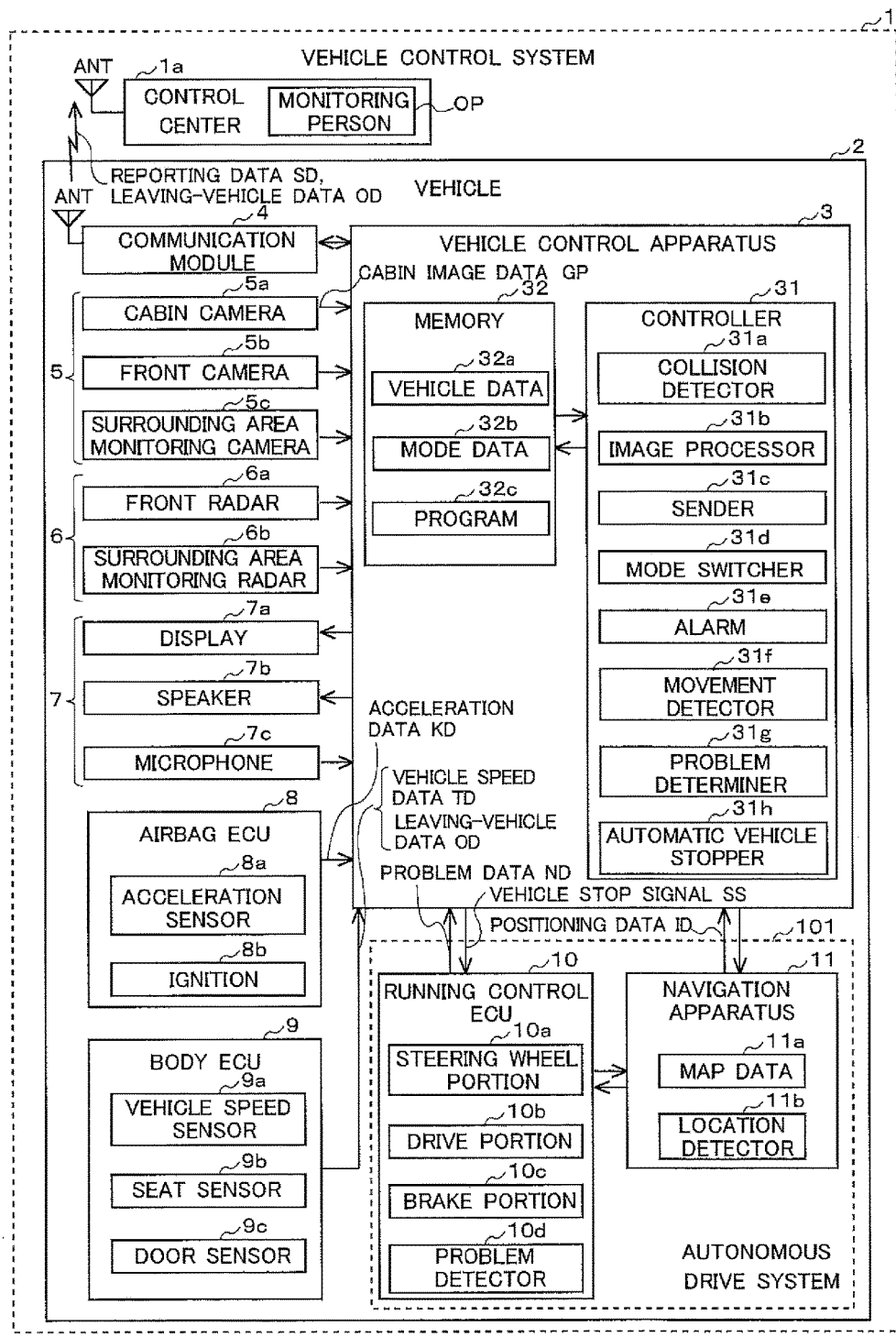
FIG. 3 illustrates a configuration of the vehicle control system.

FIG. 3 illustrates a block diagram of a configuration of the vehicle control system 1. The vehicle control system 1 includes, in addition to the control center 1a, the vehicle control apparatus 3, a communication module 4, cameras 5, a radar system 6, a vehicle-mounted device 7, the airbag ECU 8, a body ECU 9, the running control ECU 10 and the navigation apparatus 11, each of which is mounted in the vehicle 2. Moreover, the running control ECU 10 and the navigation apparatus 11 are connected to each other to configure an autonomous drive system 101 that causes the vehicle 2 to autonomously travel with no operation by the driver.

The control center 1a is an organization that controls the vehicle 2 in which the vehicle control apparatus 3 is mounted. For example, the control center 1a is a taxi company or a transportation company. Moreover, the control center 1a may be an auto maker that manufactures the vehicles 2 or a vehicle-mounted device manufacturer that manufactures the vehicle control apparatuses 3.

The control center 1a includes a server (not illustrated) and receives the reporting data SD from the vehicle control apparatus 3 via an information network. Moreover, the monitoring person OP is constantly stationed in the control center 1a to respond to the reporting data SD sent from the vehicle control apparatus 3. In other words, once receiving the reporting data SD and recognizing an occurrence of an accident or the like, the monitoring person OP rapidly sends the rescue personnel and the like to the scene of the accident or the like. Moreover, the monitoring person OP attempts to contact the driver and reports the accident and the like to the fire department and/or the police in accordance with an occurrence of an injured person and the size of the accident. The control center 1a including the server functions as a predetermined communication apparatus in this embodiment.

The vehicle 2 is a transportation device, such as a car, that is driven by the driver. The vehicle 2 may be a personally-owned private vehicle, in addition to a business vehicle, such as a taxi and a truck. Moreover, the vehicle 2 may be a two-wheeled vehicle, such as a motorcycle. The vehicle 2 includes the vehicle control apparatus 3, the communication module 4, the cameras 5, the radar system 6, the vehicle-mounted device 7, the airbag ECU 8, the body ECU 9, the running control ECU 10 and the navigation apparatus 11.

The vehicle control apparatus 3 is an electronic control apparatus that controls the vehicle 2. The vehicle control apparatus 3 includes a controller 31 and a memory 32.

The controller 31 is a microcomputer including a central processing unit (CPU), a random access memory (RAM) and a read only memory (ROM). The controller 31 controls the entire vehicle control apparatus 3. Functions of the controller 31 will be described later.

The memory 32 is a storage medium that stores data, such as an electrical erasable programmable read-only memory (EEPROM), a flash memory, a hard disk drive including a magnetic disk. The memory 32 stores vehicle data 32a, mode data 32b and a program 32c.

The vehicle data 32a is used to identify the vehicle 2. In other words, the vehicle data 32a shows the vehicle registration number, a vehicle model, a model year, a model code, etc. of the vehicle 2.

The mode data 32b is flag data showing whether or not the vehicle 2 is in an autonomous drive mode in which the vehicle 2 autonomously travels. In a case where the mode data 32b is on, the vehicle 2 is in the autonomous drive mode. In a case where the mode data 32b is out of, the vehicle 2 is not in the autonomous drive mode.

The program 32c is a firmware to be read out by the controller 31 to be executed by the controller 31 to control the vehicle control apparatus 3.

The communication module 4 is a communication device that sends and receives data to/from the control center 1a via a network. The communication module 4 is a wireless communication device using, for example, Worldwide Interoperability for Microwave Access (WiMAX) and Long Term Evolution (LTE).

The cameras 5 are video cameras including a charge coupled device (CCD) image sensor or a complementary metal oxide semiconductor (CMOS) image sensor. Once capturing images of an object, the cameras 5 generate image signals of the object and send the generated image signals to the controller 31. The cameras 5 include the cabin camera 5a, the front camera 5b and the surrounding area monitoring cameras 5c.

The cabin camera 5a is provided on a rearview mirror, an inner panel or the like to capture an image of an upper body including a face of the driver, as an object. Once capturing the image of the face of the driver, the cabin camera 5a sends the image as cabin image data GP to the vehicle control apparatus 3.

The front camera 5b is provided on a back side of the rearview mirror to capture an image of an area in front of the vehicle 2. Once capturing the image of the area in front of the vehicle 2, the front camera 5b sends the image as front image data to the vehicle control apparatus 3.

The surrounding area monitoring cameras 5c are provided on right and left side mirrors and a rear portion of the vehicle 2 to capture images of an object in a vicinity of the vehicle 2. Once capturing the image of the vicinity of the vehicle 2, each of the surrounding area monitoring cameras 5c sends the image to the vehicle control apparatus 3 as vicinity image data.

The radar system 6 functions as a sensor that emits millimeter waves to the vicinity of the vehicle 2 to detect a distance and a speed of an obstacle in the vicinity of the vehicle 2. Once detecting the distance to the obstacle and the speed thereof, the radar system 6 sends the distance and the speed of the obstacle as obstacle data to the controller 31. The radar system 6 includes the front radar 6a and the surrounding area monitoring radar 6b.

The front radar 6a is provided on a front grille of the vehicle 2 to detect a distance and a speed of a vehicle and the like travelling in front of the vehicle 2. A distance range in which the front radar 6a detects a vehicle and the like is approx. 100 m in front of the vehicle 2.

The surrounding area monitoring radar 6b is provided in a rear bumper guard of the vehicle 2 to detect distances and speeds of a vehicle, a pedestrian, etc. travelling behind the vehicle 2.

The vehicle-mounted device 7 is an electronic device that is provided in the cabin of the vehicle 2. The vehicle-mounted device 7 includes a display 7a, a speaker 7b and a microphone 7c.

The display 7a is a display apparatus that displays an image and the like. The display 7a is, for example, a liquid crystal display or an organic electro-luminescence display.

The speaker 7b is a device that outputs sounds, such as a voice, music and a buzzer, to inform a user of sound information.

The microphone 7c is a device that collects voice of a passenger in the vehicle 2 and sound in a vicinity of the vehicle control apparatus 3. The microphone 7c sends the voice and the sound collected as voice data to the controller 31.

The airbag ECU 8 is an electronic control apparatus that deploys an airbag (not illustrated) installed in the vehicle 2. The airbag ECU 8 includes an acceleration sensor 8a and an ignition 8b.

The acceleration sensor 8a detects an acceleration that occurs to the vehicle 2. The acceleration sensor 8a is a semi-conductor sensor that measures accelerations in three directions. The acceleration sensor 8a is, for example, a three axes piezoresistive acceleration sensor.

The ignition 8b is an ignition apparatus (so-called airbag squib) to deploy the airbag. Once the acceleration exceeding a threshold value is detected by the acceleration sensor 8a, the ignition 8b deploys the airbag rapidly.

The body ECU 9 is an electronic control apparatus that detects an operation with apparatuses mounted in the vehicle 2. The body ECU 9 is connected to a vehicle speed sensor 9a, a seat sensor 9b and a door sensor 9c.

The vehicle speed sensor 9a detects a speed of the vehicle 2. The vehicle speed sensor 9a detects a pulse generated in accordance with rotations of a wheel to detect the speed of the vehicle 2 based on the detected pulse.

The seat sensor 9b detects a seated state of the driver. The seat sensor 9b is a pressure sensor provided inside a seat in which the driver is seated. The seat sensor 9b detects a pressure on the seat in which the driver is seated, to detect the seated state of the driver.

The door sensor 9c detects an open or closed state of a door of the vehicle 2. The door sensor 9c detects the open or closed state of the door of the vehicle 2 by detecting a state of a courtesy lamp that is turned on and off in accordance with opening and closing of the door.

The body ECU 9 sends the speed detected by the vehicle speed sensor 9a, as vehicle speed data TD, to the vehicle control apparatus 3. When the vehicle 2 is stopped, the vehicle speed data TD indicates zero (0). Moreover, when detecting that the door is opened and that the driver is not in the seat, based on the states detected by the seat sensor 9b and the door sensor 9c, the body ECU 9 sends, to the vehicle control apparatus 3, leaving-vehicle data OD indicating that the driver has gotten out of the vehicle 2. The leaving-vehicle data OD functions as a leaving-vehicle signal in this embodiment.

The running control ECU 10 is an electronic control apparatus that controls a drive mechanism (a steering wheel apparatus, an engine and a braking apparatus) (not illustrated) in the vehicle 2 to control travelling and stop of the vehicle 2. The running control ECU 10 includes a steering wheel portion 10a, a drive portion 10b, a brake portion 10c and a problem detector 10d.

The steering wheel portion 10a controls the steering wheel apparatus (steering wheel) in the vehicle 2. The steering wheel portion 10a controls the steering wheel apparatus to change a travelling direction of the vehicle 2.

The drive portion 10b is a speed increase apparatus that controls the engine in the vehicle 2 to increase the speed of the vehicle 2. The engine is an internal combustion engine or an electric motor.

The brake portion 10c controls the braking apparatus (a brake and a park brake) in the vehicle 2. The brake portion 10c controls the braking apparatus to control the vehicle 2 to slow or stop the vehicle 2.

The problem detector 10d detects presence or absence of a problem with the running control ECU 10. The problem detector 10d monitors values of signals output by the running control ECU 10 and detects a problem with the running control ECU 10 by comparing the values to normal values stored beforehand. Once detecting a problem with the running control ECU 10, the problem detector 10d sends problem data ND to the vehicle control apparatus 3.

The navigation apparatus 11 is a route guidance providing apparatus that displays a current location of the vehicle 2 on the display 7a along with a map and that provides a route guidance to the destination to the user. The navigation apparatus 11 includes map data 11a and a location detector 11b.

The map data 11a is a vector map or a raster map including locations of roads, types of parking lots, buildings, railroads, administrative districts, coast lines, rivers, ponds, etc. Each of the roads and the like is related to an address or a latitude and a longitude. The navigation apparatus 11 sends, to the running control ECU 10, the map data 11a of a road on which the vehicle 2 is travelling to be used for autonomous drive control executed by the running control ECU 10. The map data 11a is kept updated with latest data by vehicle information and communication system (VICS) or a data updating service provided by a manufacturer of the navigation apparatus 11.

The location detector 11b is a measuring apparatus that measures the current location on the Earth, using a satellite positioning system. Examples of the satellite positioning system are Global Positioning System (GPS) and Global Navigation Satellite System (GLONASS). A receiver, not illustrated, of the location detector 11b receives signals sent from a plurality of satellites and measures the current location of the vehicle 2 based on the received signals. The current location is a position indicated, for example, by a latitude and a longitude. Once measuring the current location, the location detector 11b sends, to the controller 31, the measured current location as positioning data ID.

The running control ECU 10 and the navigation apparatus 11 are elements of the autonomous drive system 101. The autonomous drive system 101 causes the vehicle 2 to travel to the predetermined destination with no operation by the driver.

Next, the functions of the controller 31 of the vehicle control apparatus 3 will be described. The controller 31 includes a collision detector 31a, an image processor 31b, a sender 31c, a mode switcher 31d, an alarm 31e, a movement detector 31f, a problem determiner 31g and an automatic vehicle stopper 31h.

The collision detector 31a receives acceleration data KD sent from the acceleration sensor 8a of the airbag ECU 8 to acquire the acceleration that has occurred to the vehicle 2. Once acquiring the acceleration, the collision detector 31a compares the acceleration that has occurred to the vehicle 2 to a threshold value stored beforehand. In a case where the compared acceleration exceeds the threshold value, the collision detector 31a determines that a collision has occurred to the vehicle 2. The threshold value is an acceleration that will be possibly detected when the collision will occur to the vehicle 2. Therefore, in a case where the acceleration of the vehicle 2 increases only to drive over a step, the collision detector 31a does not determine that the collision has occurred to the vehicle 2. The collision detector 31a functions as a collision detecting means in this embodiment.

The image processor 31b acquires, from the cabin camera 5a, the cabin image data GP to be served as the face picture of the driver. Moreover, the image processor 31b acquires the front image data and the vicinity image data of the images captured when the acceleration has occurred to the vehicle 2, from the front camera 5b and the surrounding area monitoring cameras 5c. The image processor 31b analyzes, based on the front image data and the vicinity image data, whether or not the vehicle 2 has caused a collision accident and the like, using a known image recognition method, such as so-called pattern matching. In other words, the image processor 31*b* stores, beforehand, accident image data showing typical collision accidents and the like, and compares the front image data and the vicinity image data to the stored accident image data. In a case where the front image data or the vicinity image data is matched to the accident image data, the image processor 31*b* determines that the collision accident has occurred to the vehicle 2. The image processor 31*b* functions as an acquiring means in this embodiment. Since occurrence of the collision accident or the like is determined based on the front image data and the vicinity image data in addition to the acceleration detected by the collision detector 31*a*, false determination can be prevented as compared to the collision accident and the like is determined only based on the acceleration.

In a case where the image processor 31*b* detects that the collision accident or the like has occurred to the vehicle 2, the sender 31*c* generates the reporting data SD including the cabin image data GP and then sends the reporting data SD to the control center 1*a* by controlling the communication module 4. Once generating the reporting data SD, the sender 31*c* repeatedly sends the reporting data SD in a predetermined time cycle. The sender 31*c* functions as a first sending means and a second sending means in this embodiment.

FIG. 4 illustrates an example of the reporting data SD to be sent to the control center 1*a* by the sender 31*c*. The reporting data SD is a data group including a plurality of data that can be used to identify the vehicle 2 and the like. The reporting data SD includes a vehicle registration number NP of the vehicle 2, an acceleration GD that has occurred to the vehicle 2, a time and a date at which the acceleration has occurred, a location PO, a site AD and the cabin image data GP captured by the cabin camera 5*a* when the acceleration has occurred.

The vehicle registration number NP is, for example, "Kobe 500 Fu 22-XX." The acceleration GD is, for example, "0.05G." The time and the date PD at which the acceleration has occurred is, for example, 22:15:XX on December XXth, 20XX." The location PO is, for example, "34° 39'XX" north latitude and 135° 09' XX" east longitude." The site AD is, for example, "near XXXX intersection on route XX for west." The cabin image data GP captured by the cabin camera 5*a* is the face picture and the like of the driver.

The control center 1*a* clearly recognizes that the collision accident has occurred to the vehicle 2, by receiving the reporting data SD. Moreover, the monitoring person OP stationed in the control center 1*a* identifies the vehicle that has caused the collision accident and the site of the accident, and contacts the driver, if necessary, and then immediately reports the accident to the fire department and the like. Moreover, since the monitoring person OP receives the reporting data SD in the predetermined time cycle, the monitoring person OP can track the vehicle 2 and the driver.

With reference back to FIG. 3, the function of the controller 31 will be described. The mode switcher 31*d* turns on and off the mode data 32*b* of the memory 32.

In a case where the occurrence of the collision accident or the like has been detected, the alarm 31*e* issues a warning to the driver to stop the vehicle 2. The alarm 31*e* issues the warning by causing a message to be displayed on the display 7*a*. The alarm 31*e* functions as a warning means in this embodiment.

Figure 5:
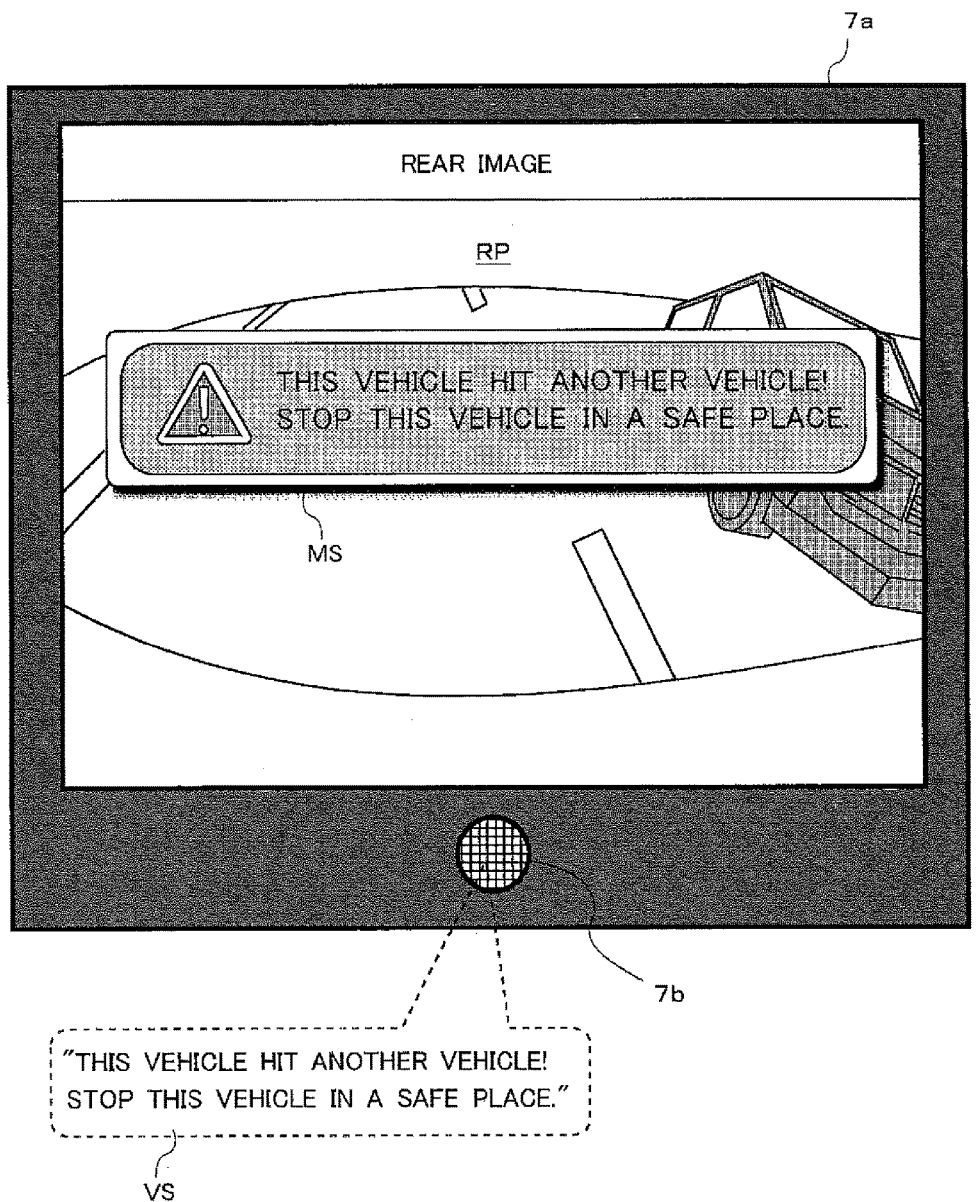
FIG. 5 illustrates an example of a warning image.

FIG. 5 illustrates a display example of a warning message MS that warns the driver about the occurrence of the collision accident and to stop the vehicle 2. The alarm 31*e* causes the warning message MS to be displayed on the display 7*a* in accordance with the occurrence of the collision accident, based on a detection result detected by the collision detector 31*a*. One example of the warning message MS is "This vehicle hit another vehicle! Stop this vehicle in a safe place." It is determined whether or not an object that the vehicle 2 has hit is a vehicle, based on image recognition processing performed by the image processor 31*b* for the front image data and the vicinity image data.

The alarm 31*e* causes a rear image RP of an area behind the vehicle 2 captured by the surrounding area monitoring cameras 5*c* to be displayed on the display 7*a*. Thus, the driver can recognize the hit vehicle and a scene of the accident, referring to the warning message MS along with the rear image RP. The driver can recognize that the driver must stop the vehicle 2 and must sort out the accident and the like.

Moreover, the alarm 31*e* outputs a content of the warning message MS from the speaker 7*b* as a warning voice VS. Thus, the driver can auditorily recognize that the vehicle 2 has hit the vehicle and that the vehicle 2 must be stopped. Even when the driver does not gaze at the area in front of the vehicle 2 and at the display 7*a* due to the autonomous drive, the driver can auditorily recognize, by the warning voice VS, that the vehicle 2 has hit another vehicle and the driver must stop the vehicle 2.

Figure 6:
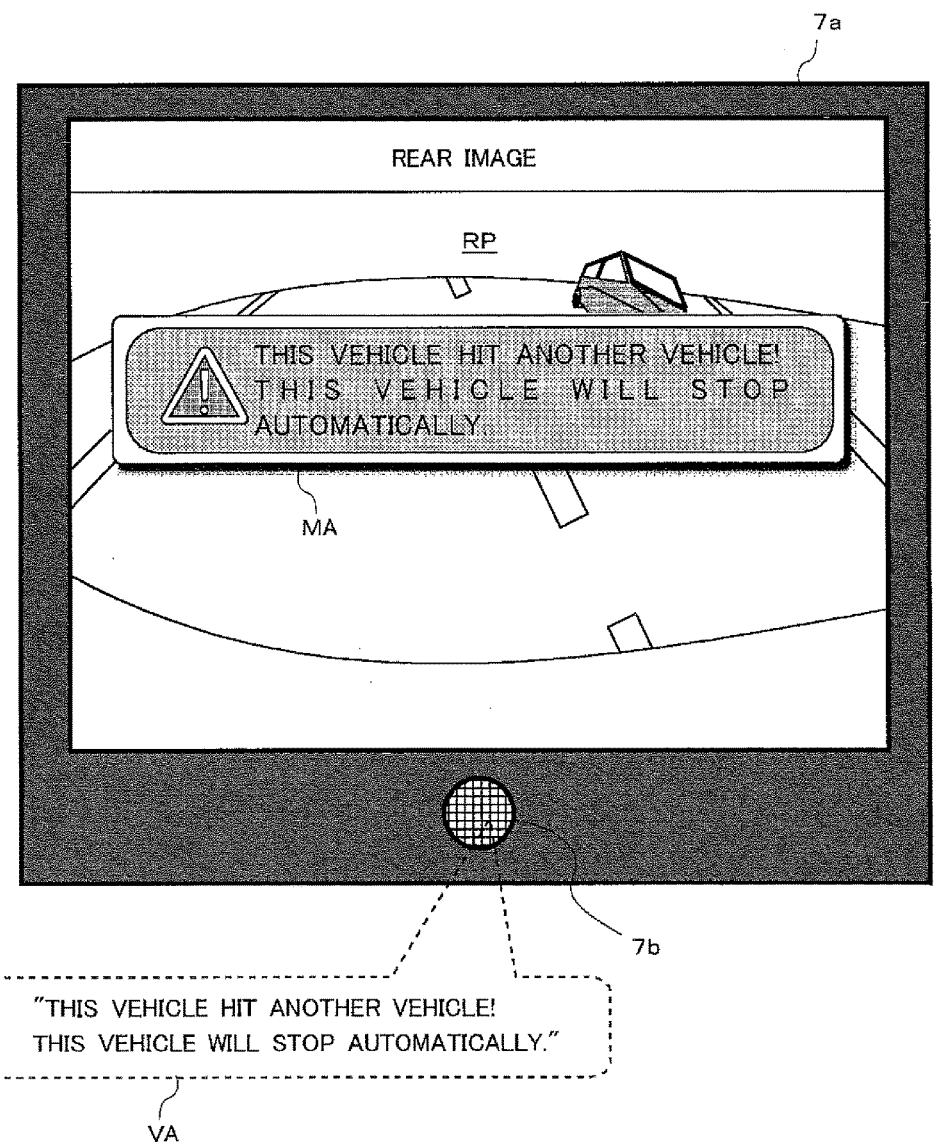
FIG. 6 illustrates an example of a warning message.

FIG. 6 illustrates a display example of a pre-notifying message MA output by the alarm 31*e* to inform the driver that a collision or the like has occurred and to pre-notify the driver that the vehicle 2 will be stopped automatically. If the driver does not stop the vehicle 2 after the alarm 31*e* has issued the warning that prompts the driver to stop the vehicle 2 in a safe place, the alarm 31*e* causes the pre-notifying message MA to be displayed on the display 7*a*. One example of the pre-notifying message MA is "This vehicle hit another vehicle! This vehicle will stop automatically." Thus, the driver can auditorily recognize beforehand that the vehicle 2 will stop automatically.

The alarm 31*e* outputs a content of the pre-notifying message MA, like the warning message MS, from the speaker 7*b* as a pre-notifying voice VA.

With reference back to FIG. 3, the function of the controller 31 will be described. The movement detector 31*f* acquires the vehicle speed data TD and the leaving-vehicle data OD from the body ECU 9 and then detects movement of the vehicle 2. In other words, if the vehicle speed data TD shows that the vehicle speed is zero (0), the movement detector 31*f* detects stop of the vehicle 2. Moreover, if the leaving-vehicle data OD shows that the driver has gotten out of the vehicle, the movement detector 31*f* determines that the driver has gotten out of the vehicle. The movement detector 31*f* functions as a vehicle stop detection means and a leaving-vehicle detection means in this embodiment.

The problem determiner 31*g* determines whether or not the running control ECU 10 is normal. The problem determiner 31*g* determines whether or not the running control ECU 10 is normal, based on the problem data ND sent by the problem detector 10*d* of the running control ECU 10 to the vehicle control apparatus 3. In other words, in a case where the problem data ND has been sent to the vehicle control apparatus 3, the problem determiner 31*g* determines that the running control ECU 10 is not normal (has a problem).

The automatic vehicle stopper 31*h* sends, to the running control ECU 10, a vehicle stop signal SS that instructs the vehicle 2 to stop so as to stop the vehicle 2. The automatic vehicle stopper 31*h* functions as a stopping means in this embodiment.

<1-5. Process>

Figure 7:
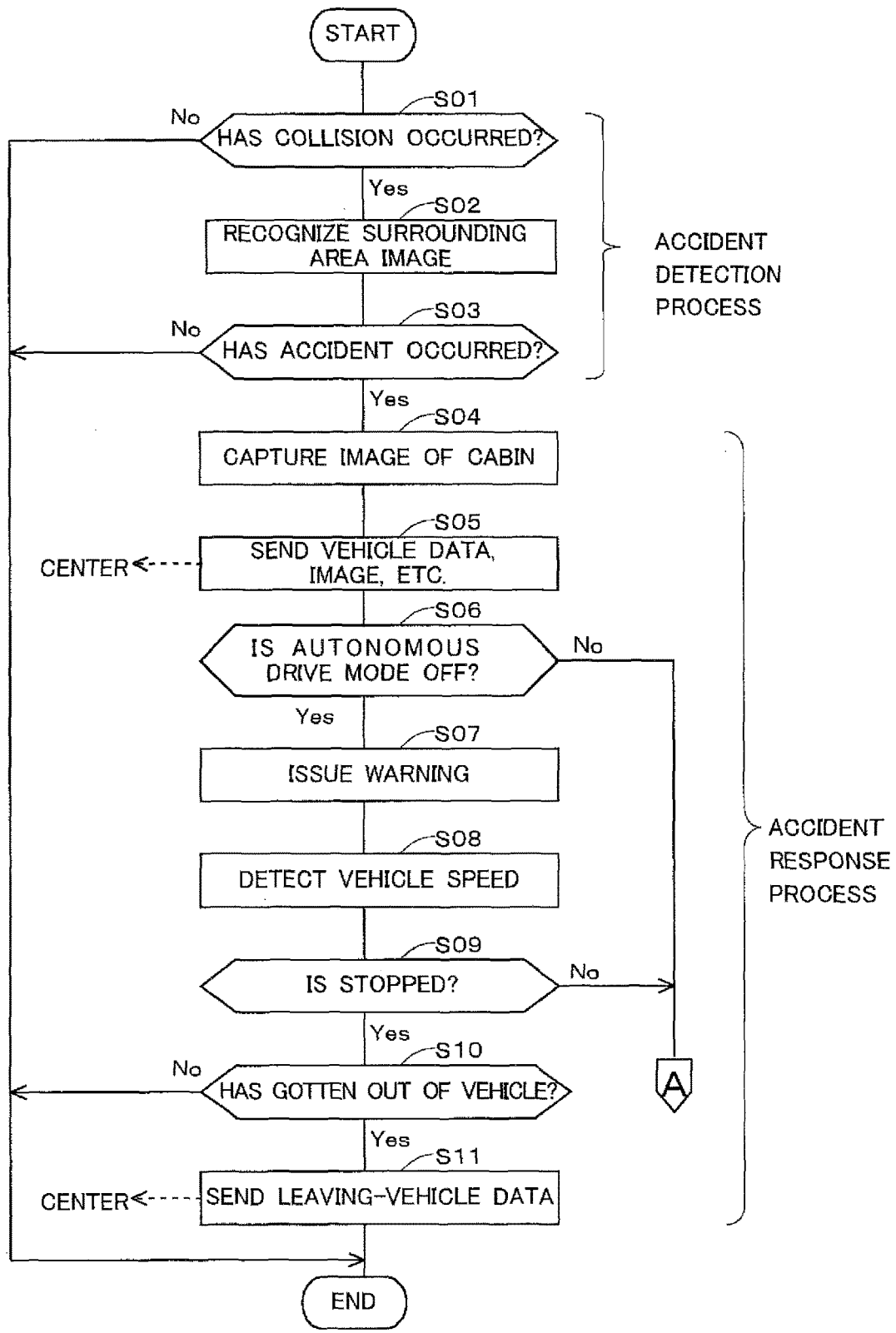
FIG. 7 is a flowchart showing process steps of the vehicle control apparatus.
Figure 8:
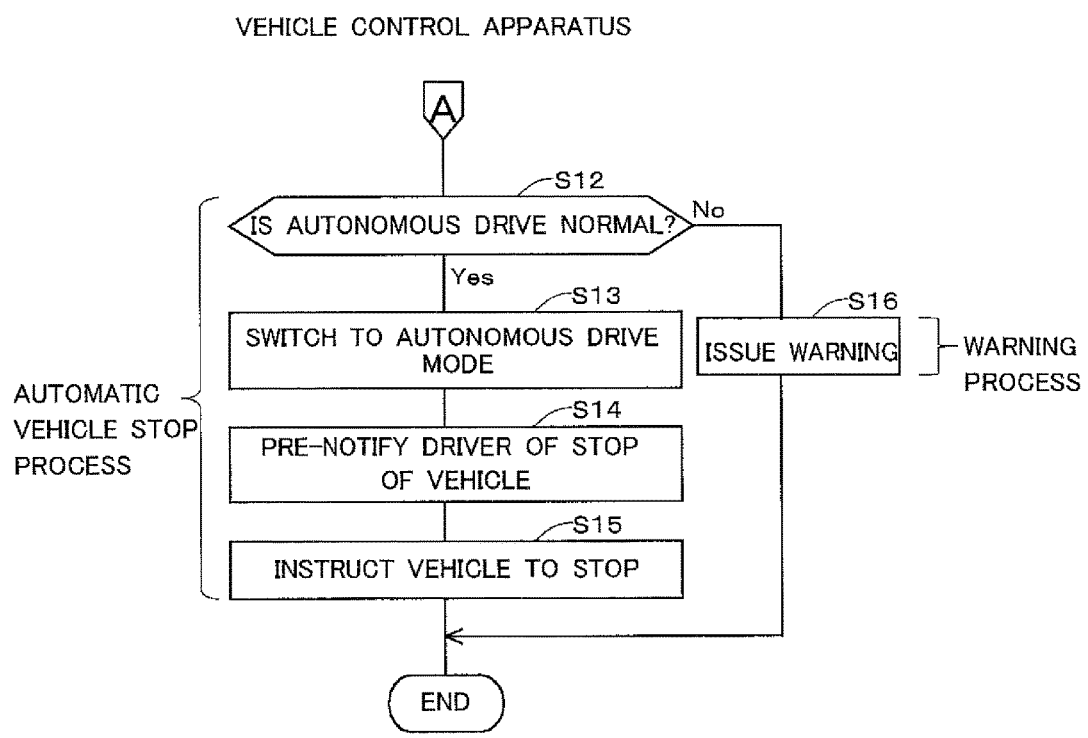
FIG. 8 is a flowchart showing process steps of the vehicle control apparatus.

Next, process steps of the vehicle control apparatus 3 will be described. Each of FIGS. 7 and 8 is a flowchart showing the process steps of the vehicle control apparatus 3. The process steps are repeatedly performed in a predetermined time cycle.

Steps S01 to S03 illustrated in FIG. 7 are for an accident detection process. The accident detection process is a process of recognizing that a collision or the like has occurred to the vehicle 2 and that an accident has occurred due to the collision or the like. Moreover, steps S04 to S11 are for an accident response process. The accident response process is performed to capture images of the cabin of the vehicle 2 when it is determined that the accident has occurred to the vehicle 2.

When the process is started, the collision detector 31a determines whether or not a collision has occurred to the vehicle 2 (the step S01). The collision detector 31a determines, based on the acceleration data KD sent from the acceleration sensor 8a, whether or not the collision has occurred to the vehicle 2. In other words, the collision detector 31a determines that the collision has occurred to the vehicle 2 in the case where the acceleration data KD exceeds the predetermined threshold value that is a reference value to determine an occurrence of a collision to the vehicle 2. The predetermined threshold value is, for example, 0.04G.

In a case where the collision detector 31a determines that the collision has not occurred to the vehicle 2 (No in the step S01), the process ends because the vehicle control apparatus 3 does not need to perform control without an occurrence of a collision to the vehicle 2.

On the other hand, in a case where the collision detector 31a determines that the collision has occurred to the vehicle 2 (Yes in the step S01), the image processor 31b analyzes the images of the vicinity of the vehicle 2 captured by the front camera 5b and the surrounding area monitoring cameras 5c when the collision has occurred, using the foregoing image recognition processing (the step S02).

The image processor 31b determines whether or not an accident or the like has occurred to the vehicle 2, based on a result of the image recognition processing (the step S03).

In a case where the image processor 31b determines that an accident or the like has not occurred to the vehicle 2 (No in the step S03), the process ends because the vehicle control apparatus 3 does not need to perform control without an occurrence of an accident or the like to the vehicle 2.

On the other hand, the image processor 31b determines that an accident or the like has occurred to the vehicle 2 (Yes in the step S03), the image processor 31b controls the cabin camera 5a to capture the image of the face of the driver in the cabin (the step S04).

Once the image processor 31b captures the image of the cabin, the sender 31c generates the reporting data SD and then sends the generated reporting data SD to the control center 1a (the step S05). The reporting data SD is the data group, as described above, including the vehicle data 32a stored in the memory 32, the acceleration detected by the acceleration sensor 8a, the time and the location and the site of the vehicle 2 when occurrence of the acceleration has been detected by the location detector 11b of the navigation apparatus 11 and the face picture of the driver captured by the cabin camera 5a. Since the sender 31c sends the reporting data SD, the control center 1a recognizes that the collision or the like has occurred to the vehicle 2 and identifies the driver.

Once the sender 31c sends the reporting data SD to the control center 1a, the mode switcher 31d determines whether or not the vehicle 2 is in the autonomous drive mode (the step S06). The mode switcher 31d determines whether or not the vehicle 2 is in the autonomous drive mode, referring to the mode data 32b in the memory 32.

The mode switcher 31d determines that the autonomous drive mode is not off, i.e., the vehicle 2 is in the autonomous drive mode (Yes in the step S06), the alarm 31e causes the warning message MS to be displayed on the display 7a (the step S07). Thus, the driver recognizes that the vehicle 2 has hit another vehicle and that the driver must stop the vehicle 2.

Once the alarm 31e causes the warning message MS to be displayed, the movement detector 31f detects a speed of the vehicle 2 (the step S08). The movement detector 31f detects the speed of the vehicle 2 by acquiring the vehicle speed data TD from the vehicle speed sensor 9a of the body ECU 9.

Once detecting the speed of the vehicle 2, the movement detector 31f determines whether or not the vehicle 2 is stopped, i.e., the vehicle speed of the vehicle 2 is zero (0) (the step S09).

In a case where the movement detector 31f determines that the vehicle speed of the vehicle 2 is zero (Yes in the step S09), the movement detector 31f then deteinines whether or not the driver has gotten out of the vehicle 2 (the step S10).

In a case where the movement detector 31f determines that the driver has not gotten out of the vehicle 2 (No in the step S10), the process ends. In a case where the driver has not gotten out of the vehicle 2, it seems that the driver does not attempt to sort out the accident and the like. However, the driver does not attempt to flee because the driver at least stops the vehicle 2 near the scene of the accident. Therefore, in a case where the vehicle 2 stops, the vehicle control apparatus 3 ends the process although the driver has not gotten out of the vehicle 2.

On the other hand, once the movement detector 31f determines that the driver has gotten out of the vehicle 2 (Yes in the step S10), the sender 31c sends the leaving-vehicle data OD showing that the driver has gotten out of the vehicle 2 (the step S11). Once the control center 1a receives the leaving-vehicle data OD, in a case where it is determined that the driver has gotten out of the vehicle 2, the control center 1a does not make a report to the fire department and the like because it is expected that the driver attempts to sort out the accident and the like. Thus, it is possible to prevent the control center 1a from making a useless report to the authorities. Once the sender 31c sends the leaving-vehicle data OD to the control center 1a, the process ends.

Next described will be a process performed in a case where the mode switcher 31d determines that the vehicle 2 is not in the autonomous drive mode in the step S06 (No in the step S06), or in a case where the movement detector 31f determines that the vehicle 2 is not stopped in the step S09 (No in the step S09).

Steps S12 to S15 are an automatic vehicle stop process. The automatic vehicle stop process is a process of automatically, i.e., forcibly, stopping the vehicle 2 that has caused a collision accident or the like. It is possible to prevent the driver from fleeing a scene of an accident by performing the automatic vehicle stop process.

First, the problem determiner 31g determines whether or not the running control ECU 10 is normal (the step S12). The problem determiner 31g determines whether or not the running control ECU 10 is normal by acquiring the problem data ND sent from the problem detector 10d of the running control ECU 10.

In a case where the problem determiner 31g determines that the running control ECU 10 is not normal, i.e. the running control ECU 10 has a problem (No in the step S12), the alarm 31*e* causes the warning message MS to be displayed on the display 7*a* to issue the warning that prompts the driver to stop the vehicle 2 (warning process in the step S16). In a case where the vehicle 2 is attempted to be stopped automatically although the running control ECU 10 has a problem, the vehicle 2 cannot be stopped automatically but also the vehicle 2 may cause a secondary accident. Therefore, in the case where the running control ECU 10 has a problem, the vehicle 2 should not be stopped automatically and the displayed warning message MS should prompt the driver of the vehicle 2 to voluntarily stop the vehicle 2.

In a case where the problem determiner 31*g* determines that the running control ECU 10 is normal (Yes in the step S12), the mode switcher 31*d* operates the mode data 32*b* to switch the vehicle 2 to the autonomous drive mode (the step S13). In other words, the mode switcher 31*d* turns on the mode data 32*b* because the running control ECU 10 is normal so that there is no problem if the vehicle 2 is switched to the autonomous drive mode.

Once the mode switcher 31*d* switches the vehicle 2 to the autonomous drive mode, the alarm 31*e* causes the pre-notifying message MA showing that the vehicle 2 will be stopped automatically, to be displayed on the display 7*a* (the step S14). While the vehicle 2 is being stopped automatically, operations made by the driver with the steering wheel and the accelerator are inactive. Therefore, it is recommended that the driver should be notified before automatic stop of the vehicle 2 is started. Thus, even in a case where the vehicle 2 moves differently from the operation by the driver, the driver will not be confused.

Once the alarm 31*e* causes the pre-notifying message MA to be displayed, the automatic vehicle stopper 31*h* sends, to the running control ECU 10, the vehicle stop signal SS to instruct the vehicle 2 to stop immediately (the step S15).

Once the running control ECU 10 receives the vehicle stop signal SS from the automatic vehicle stopper 31*h*, the running control ECU 10 controls the vehicle 2 to travel to a near safe place shown by the navigation apparatus 11, in which the vehicle 2 can be stopped, to stop the vehicle 2. Until the vehicle 2 is stopped, the operations by the driver with the steering wheel and the accelerator are inactive so that the driver cannot drive the vehicle 2. Thus, it is possible to prevent the driver from fleeing a scene of the accident and the like. Once the automatic vehicle stopper 31*h* sends the vehicle stop signal SS and the running control ECU 10 stops the vehicle 2, a series of the process ends.

As described above, in the vehicle control system 1 of the first embodiment, in a case where the vehicle control apparatus 3 mounted in the vehicle 2 determines that the vehicle 2 has hit an object, the vehicle control apparatus 3 issues a warning to the driver of the vehicle 2 to stop the vehicle 2. Once issuing the warning to the driver, in a case where stop of the vehicle 2 is not detected, the vehicle control apparatus 3 stops the vehicle 2 regardless of the operation by the driver.

Thus, while giving a priority on prompting the driver to voluntarily stop the vehicle. 2, it is possible to prevent the driver from fleeing the scene of the accident and the like.

Moreover, since the vehicle 2 stops in a safe place immediately, it is possible to sort out the accident and the like by the driver more easily.

Further, in a case where the driver is not aware of occurrence of the accident and the like due to autonomous drive, it is possible to bring the driver's attention to the accident so that the driver is prompted to stop the vehicle 2 voluntarily.

Even in a case where the driver flees the scene of the accident and the like, it is possible to track the vehicle 2 and the driver.

If a driver who drives a business vehicle (taxi, distribution truck, etc.) for passenger transportation or cargo transportation flees a scene of a collision accident or the like caused by the driver, a social image of a company for which the driver works will be damaged. If the driver recognizes beforehand that the vehicle control apparatus 3 is mounted in the vehicle, an attempt of the driver to flee is controlled or the driver lose desire to flee so that it is possible to prevent the company from losing the social image thereof. Therefore, when a collision accident and the like is detected, it is effective to immediately communicate to the driver that a face picture of the driver has been captured and the face picture has been sent to the control center 1*a* in order to control the attempt or to cause the driver to lose the desire to flee.

2. Second Embodiment

<2-1. Outline>

In the first embodiment described above, the reporting data SD is sent to the control center 1*a* before the warning is issued to the driver to stop the vehicle 2. However, in a second embodiment, after a warning has been issued to a driver, in a case where the driver does not stop the vehicle or does not get out of the vehicle, the reporting data SD is sent to the control center 1*a* Thus, the reporting data SD is sent to the control center 1*a* only in a case where the driver may flee a scene of an accident and the like. Therefore, it is possible to prevent the control center 1*a* from making a useless reporting to the authorities after receiving the reporting data SD.

The second embodiment partially includes elements and process steps in the first embodiment. Therefore, differences from the first embodiment will be mainly described below. Moreover, same reference numbers will be given to the elements and the process steps same as the elements and the process steps in the first embodiment.

<2-2. Configuration>

A configuration of a vehicle control apparatus 3 in the second embodiment is same as the configuration of the vehicle control apparatus 3 in the first embodiment. Therefore, an illustration of the vehicle control apparatus 3 of the second embodiment is omitted.

<2-3. Process Steps>

Figure 9:
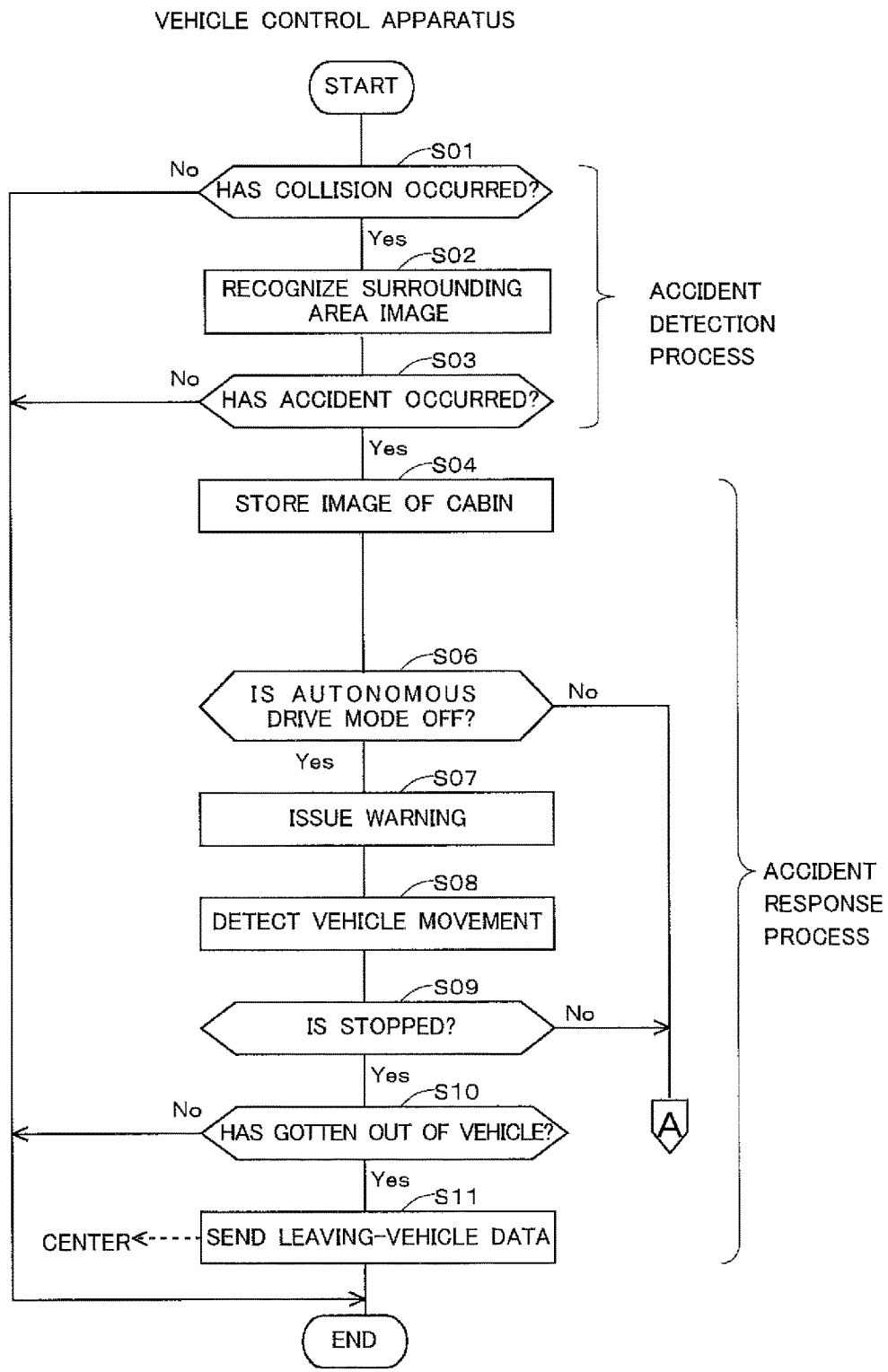
FIG. 9 is a flowchart showing process steps of a vehicle control apparatus of a second embodiment.
Figure 10:
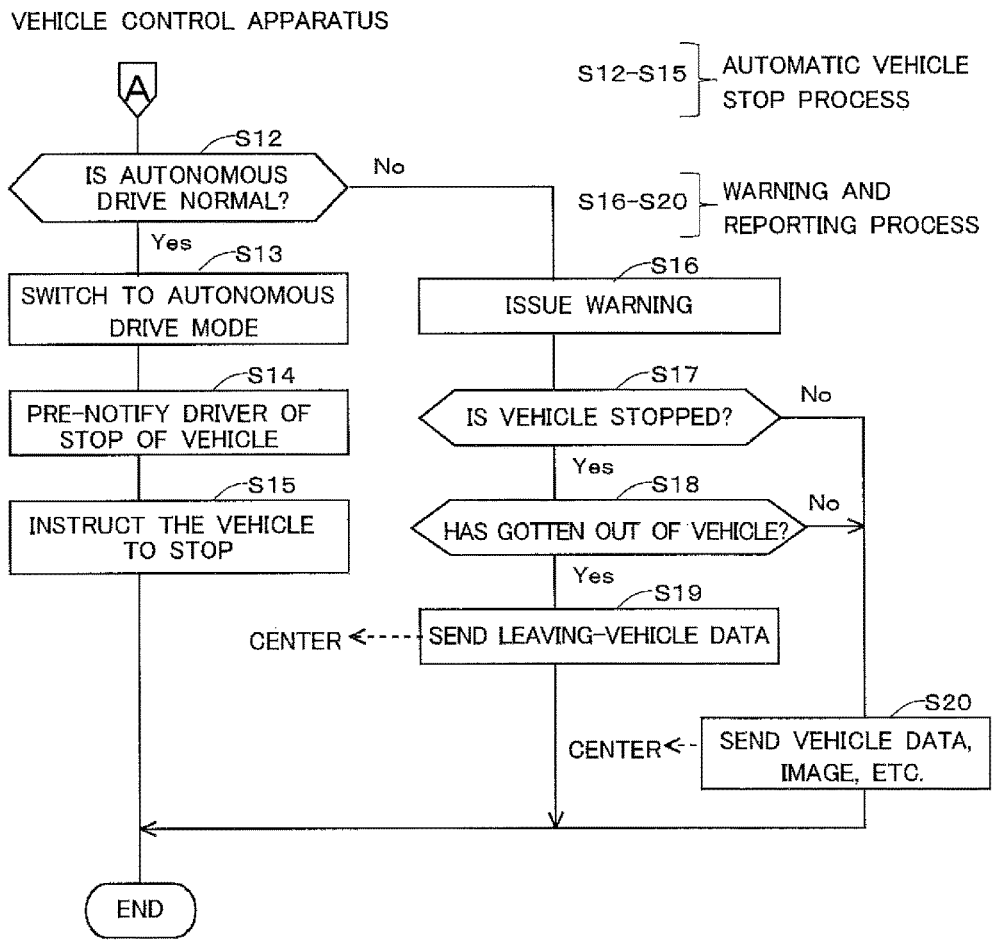
FIG. 10 is a flowchart showing process steps of the vehicle control apparatus of the second embodiment.

Each of FIGS. 9 and 10 is a flowchart showing the process steps of the vehicle control apparatus 3 of the second embodiment. The process steps of the second embodiment include the process steps of the first embodiment. Therefore, differences from the process steps of the first embodiment will be mainly described below.

Once an image processor 31*b* captures an image of a face of the driver in a cabin in a step S04 in FIG. 9, a mode switcher 31*d* determines whether or not a vehicle 2 is in an autonomous drive mode (a step S06). In other words, being different from the first embodiment, at this time point, a sender 31*c* does not send a reporting data SD to a control center 1*a* because there is a possibility that the driver may attempt to sort out an accident or the like.

Steps S16 to S20 in FIG. 10 are a warning and reporting process. The warning and reporting process is a process of issuing, to the driver, a warning to the driver to stop the vehicle 2 and of making a report on an occurrence of the accident or the like to the control center 1*a* in a case where there is a possibility that the driver may flee.

Once an alarm 31e causes a warning message MS to be displayed (the step S16), a movement detector 31f determines whether or not the vehicle 2 is stopped (the step S17).

In a case where the movement detector 31f determines that the vehicle 2 is stopped (Yes in the step S17), the movement detector 31f then determines whether or not the driver has gotten out of the vehicle 2 (the step S18).

In a case where the movement detector 31f determines that the driver has gotten out of the vehicle 2 (Yes in the step S18), the sender 31c sends leaving-vehicle data OD to the control center 1a (the step S19).

On the other hand, in a case where the movement detector 31f determines that the vehicle 2 is not stopped (No in the step S17) or in a case where the driver has not gotten out of the vehicle 2 (No in the step S18), the sender 31c sends the reporting data SD to the control center 1a (the step S20).

In a case where the driver does not stop the vehicle 2 or does not get out of the vehicle 2 even if the alarm 31e issues the warning, the driver may attempt to flee the scene of the accident and the like. In this case, the reporting data SD is sent to the control center 1a so that an occurrence of the accident and the like can be communicated to the control center 1a at an appropriate time point. Moreover, it is possible to prevent the reporting data SD from being sent to the control center 1a before determining whether or not the driver stops the vehicle 2 or whether or not the driver gets out of the vehicle 2. In other words, there is a case where the control center 1a makes a report to a fire department or a police station after receiving the reporting data SD. However, there is a case where the driver gets out of the vehicle 2 to attempt to sort out the accident after the control center 1a has received the reporting data SD. In this case, the report from the control center 1a to the authorities is useless and the report may serve as a request for unnecessary dispatch of the authorities. Therefore, it is recommended that the reporting data SD should be sent to the control center 1a even if the alarm 31e issues a warning but the driver does not stop or get out of the vehicle 2 so that the driver may flee the scene of the accident. Thus, unnecessary report to the authorities from the control center 1a can be prevented.

<3. Modifications>

The invention is not limited to the foregoing embodiments but other modifications are possible. Some modifications of the invention will be described below. Any form of the embodiments described above and the modifications described below may be arbitrarily combined with one another.

In the foregoing embodiments, in the case where a collision and an accident are determined to have occurred to the vehicle 2 (Yes in the steps S01 and S03), the driver is pre-notified of a message that the vehicle 2 will be stopped (the step S14 in FIG. 8), and then the vehicle stop signal SS to instruct the vehicle 2 to stop immediately is sent to the running control ECU 10 (the step S15 in FIG. 8).

However, if a level of a collision to the vehicle 2 is large, the driver may faint or be in panic, for example, because the driver hits the head on a corner in the cabin of the vehicle 2 due to the collision or because the driver is squeezed by a deployed airbag. In this case, a pre-notification of stopping the vehicle is meaningless. Moreover, the driver is unconscious or is in panic so that the driver is in a state in which the driver cannot drive the vehicle 2. Therefore, the vehicle 2 needs to be stopped immediately to prevent an occurrence of a secondary collision and a secondary accident.

Therefore, in a case where the level of the collision of the vehicle 2 is determined to exceed a level that the driver may faint or may panic, a state of the driver is then determined based on an image captured by the cabin camera 5a. Then, in a case where the driver is unconscious or in panic, it is recommended that the vehicle 2 should be stopped immediately without a pre-notification of stopping the vehicle 2.

Figure 11:
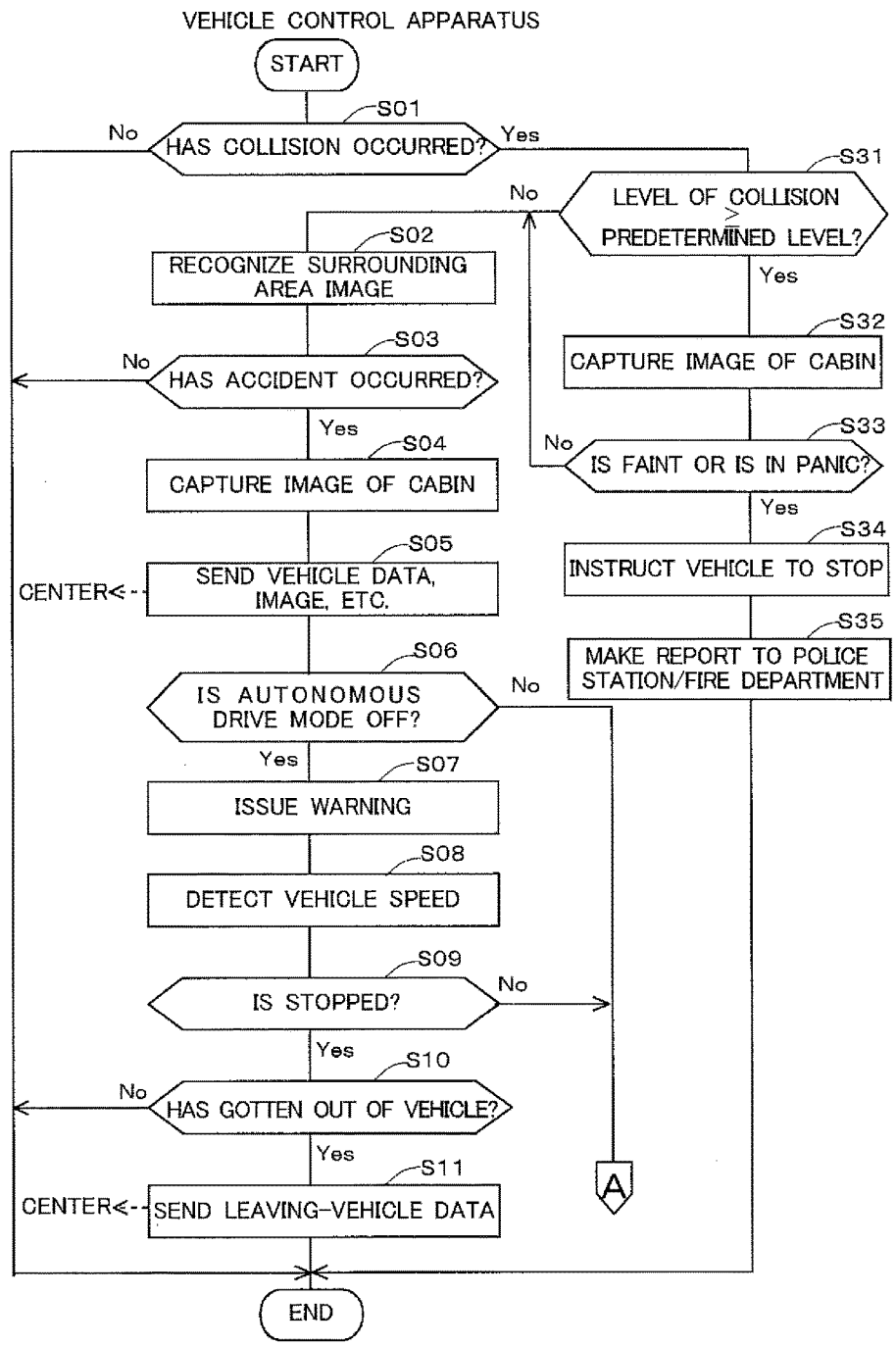
FIG. 11 is a flowchart showing process steps of a vehicle control apparatus of a modification.

FIG. 11 is a flowchart showing process steps of a vehicle control apparatus 3 of the modification. The process steps of the modification include the process steps of the first embodiment. Therefore, differences from the process steps of the first embodiment will be mainly described. Same reference numbers will be given to the process steps same as the process steps in the first embodiment.

First, a collision detector 31a determines whether or not a collision has occurred to a vehicle 2 (a step S01).

In a case where the collision detector 31a determines that the collision has occurred to the vehicle 2 (Yes in the step S01), the collision detector 31a determines lines whether or not a level of the collision is equal to or greater than a predetermined level, based on acceleration data KD sent from an acceleration sensor 8a (a step S31). The predetermined level is, for example, 0.1 G, and is a level at which the driver may faint or panic.

In a case where the collision detector 31a determines that the level of the collision is not equal to or greater than the predetermined level (No in the step S31), the process moves to a step S02.

On the other hand, in a case where the collision detector 31a determines that the level of the collision is equal to or greater than the predetermined level (Yes in the step S31), an image processor 31b controls a cabin camera 5a to capture an image of a face of the driver in a cabin (a step S32).

The image processor 31b analyzes the image of the face of the driver captured by the cabin camera 5a, using an image recognition processing, to determine whether or not the driver is faint or is in panic (a step S33). A direction and move of a gaze of the driver and positions and move of pupils of the driver are elements for determining whether or not the driver is faint or is in panic.

In a case where the image processor 31b determines that the driver is not faint or is not in panic (No in the step S33), the process moves to the step S02.

On the other hand, in a case where the image processor 31b determines that the driver is faint or is in panic (Yes in the step S33), an automatic vehicle stopper 31h sends a vehicle stop signal SS to instruct the vehicle 2 to stop immediately, to a running control ECU 10 (a step S34). Thus, the vehicle 2 can be stopped immediately without the pre-notification or a warning in a case where the driver is in a state in which the driver is incapable of driving the vehicle 2 because the driver is faint or is in panic. Thus, a secondary collision or a secondary accident can be prevented. Therefore, in a case where the driver is normal, the warning is issued to the driver to stop the vehicle 2. In this case, if the driver does not stop the vehicle 2, the vehicle 2 may be stopped automatically to prevent the driver from fleeing. In this case, a report is made to a police station so that a situation relating to the accident can be sorted out early.

Once the automatic vehicle stopper 31h sends the vehicle stop signal SS to the running control ECU 10, a sender 31c makes a report that the collision has occurs and that the driver is faint or is in panic, to the control center 1a and the authorities, such as a police station and a fire department, (a step S35). Once the sender 31c makes the report, the process ends. The report that the collision has occurs and that the driver is faint or is in panic is made to the authorities and the control center 1a so that the situation can be sorted out early.

Next, other modifications will be described. One unit in the foregoing embodiments is not necessarily configured as one unit. The one unit in the foregoing embodiments may be configured as separate units. For example, the memory 32 may be separated from the vehicle control apparatus 3.

Separate units in the foregoing embodiments are not necessarily configured as separate units. The separate units in the foregoing embodiments may be configured as one unit. For example, the vehicle control apparatus 3 and the airbag ECU 8 may be combined as one unit, or the vehicle control apparatus 3 and the running control ECU 10 may be combined as one unit. In other words, two or more of the vehicle control apparatus 3, the airbag ECU 8, the body ECU 9, the running control ECU 10 and the navigation apparatus 11 may be, combined as one unit.

The control center 1a may include a part of elements of apparatuses in the vehicle 2 and the elements of the vehicle control apparatus 3. Moreover, the control center 1a may perform a part of the functions of the vehicle control apparatus 3. For example, the control center 1a may perform the function of the image processor 31b. In this case, a process load of the control center 1a can be reduced.

In the foregoing embodiments, the vehicle control apparatus 3 determines whether or not it is necessary to stop the vehicle 2, based on the acceleration data KD and data of the image of the vicinity of the vehicle 2. However, the acceleration data KD and the data of the image of the vicinity of the vehicle 2 may be sent to the control center 1a and then the control center 1a may be determined whether or not it is necessary to stop the vehicle 2.

In the foregoing embodiments, when an accident or the like is determined to have occurred to the vehicle 2, the image of the face of the driver is captured by controlling the cabin camera 5a. However, before an accident or the like occurs to the vehicle 2, the image of the face of the driver may be captured beforehand.

In the foregoing embodiments, the image data including the face picture of the driver is sent to the control center 1a. However, the face picture of the deriver may not be included if the driver can be identified from the sent image data. Therefore, the image data to be sent may be image data acquired by capturing an image of a driver's license of a name plate of the driver.

The term "autonomous drive" in the foregoing embodiments means not only complete autonomous drive control of the vehicle 2 with no operation by the driver but also partial autonomous drive control of the vehicle 2 requiring some operations by the driver.

In the foregoing embodiments, the configuration described as hardware may be implemented by software, and a function described as software may be implemented by hardware. Also, a function of hardware or software may be implemented by a combination of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A vehicle control apparatus that controls a vehicle, the vehicle control apparatus comprising a microcomputer configured to:
   detect whether a collision has occurred between the vehicle and an object;
   issue a warning to a driver of the vehicle to stop the vehicle in a case where the collision has occurred;
   detect whether the vehicle is stopped;
   stop the vehicle regardless of an operation by the driver after issuing the warning to the driver, in a case where the vehicle is not detected to be stopped after issuing the warning to the driver;
   acquire image data acquired by capturing an image of a cabin of the vehicle;
   send the image data to a predetermined communication center that is located externally of the vehicle after issuing the warning to the driver, in the case where the vehicle is not detected to be stopped;
   detect whether or not the driver has gotten out of the vehicle; and
   send, to the predetermined communication center, a leaving vehicle signal showing that the driver has gotten out of the vehicle in a case where the driver is detected to have gotten out of the vehicle.

2. The vehicle control apparatus according to claim 1, wherein the microcomputer is configured to:
   send the image data to the predetermined communication center before stopping the vehicle, in the case where the collision has occurred.

3. A vehicle control method of controlling a vehicle, the vehicle control method comprising the steps of:
   (a) a microcomputer of the vehicle detecting whether a collision has occurred between the vehicle and an object;
   (b) the microcomputer of the vehicle issuing a warning to a driver of the vehicle to stop the vehicle in a case where the collision has occurred;
   (c) the microcomputer of the vehicle detecting whether the vehicle is stopped;
   (d) the microcomputer of the vehicle stopping the vehicle regardless of an operation by the driver after the microcomputer has issued the warning to the driver, in a case where the vehicle is not detected to be stopped after issuing the warning to the driver;
   (e) the microcomputer of the vehicle acquiring image data acquired by capturing an image of a cabin of the vehicle;
   (f) the microcomputer of the vehicle sending the image data to a predetermined communication center that is located externally of the vehicle after the microcomputer has issued the warning to the driver, in the case where the vehicle is not detected to be stopped;
   (g) the microcomputer of the vehicle detecting whether or not the driver has gotten out of the vehicle; and
   (h) the microcomputer of the vehicle sending, to the predetermined communication center, a leaving vehicle signal showing that the driver has gotten out of the vehicle in a case where the driver is detected to have gotten out of the vehicle.

4. The vehicle control method according to claim 3, wherein:
   the microcomputer of the vehicle sends the image data to the predetermined communication center before the microcomputer stops the vehicle, in the case where the collision has occurred.

* * * * *